INVENTORS
Joseph A. Kulhavy &
Milton C. Bennett
WILSON, SETTLE, BATCHELDER & CRAIG
ATTORNEYS United States Patent Office 3,435,901
Patented Apr. 1, 1969

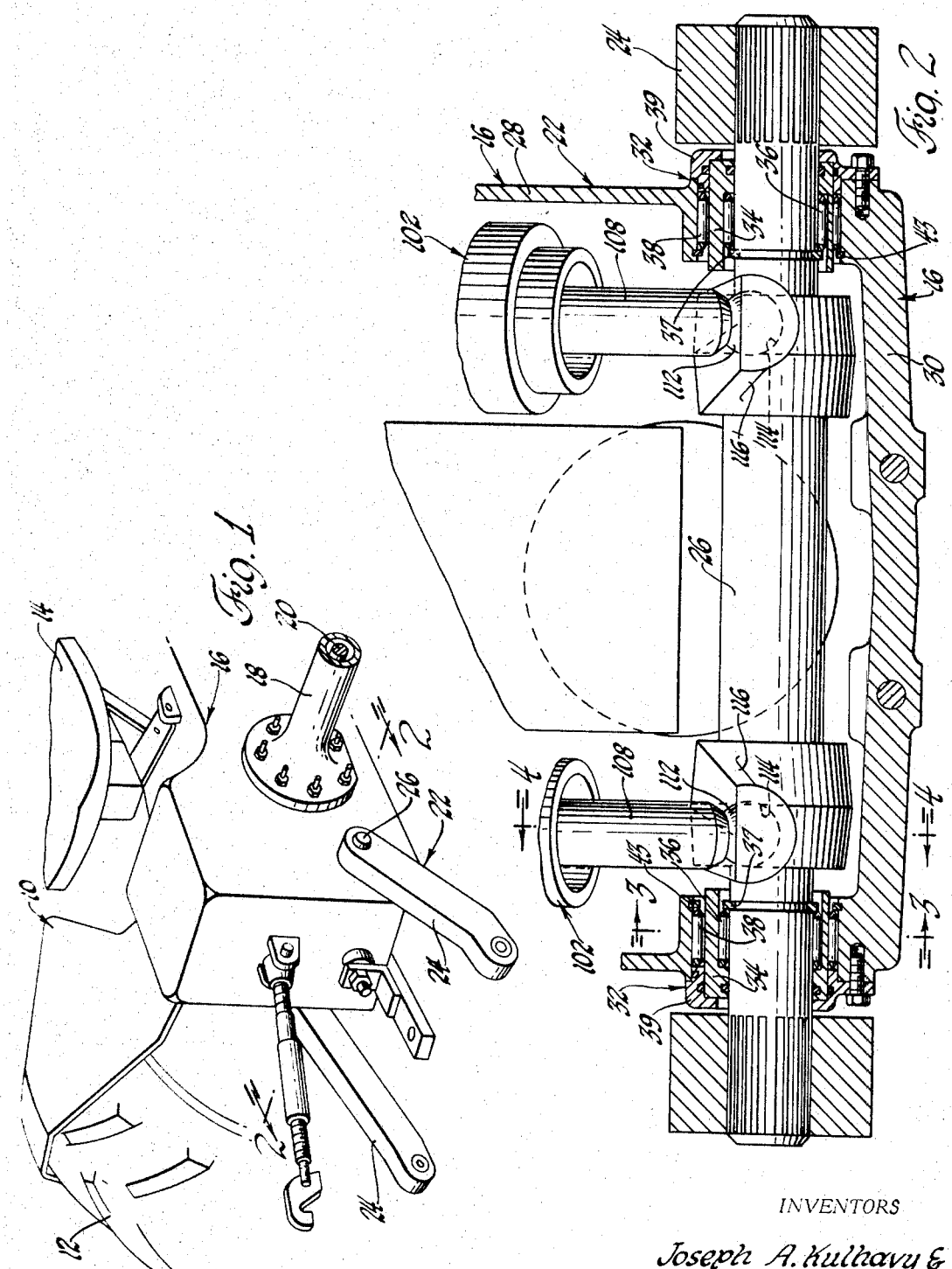

3,435,901
TRACTOR-IMPLEMENT HITCH SYSTEM
Milton C. Bennett and Joseph A. Kulhavy, Racine, Wis., assignors to J. I. Case Company, Racine, Wis., a corporation of Wisconsin
Filed Oct. 7, 1965, Ser. No. 493,766
Int. Cl. A01b 63/112
U.S. Cl. 172—9                                6 Claims

ABSTRACT OF THE DISCLOSURE

An automatic draft and position control means for a tractor wherein the sensing element is a shaft eccentrically mounted in the tractor body for rotation about one axis and is also mounted for rotation about its own axis. The draft arms of the tractor are rigidly secured to the shaft.

The present invention relates to a novel system for hitching an implement, of the agricultural type, to a tractor to selectively accommodate automatic draft control or alternatively position (depth) control operation.

In recent years, the tractor-implement hitch art has become comparatively sophisticated. Almost completely automated hitch units, which better accommodate the high speed and high horsepower operation of modern tractors, have come to replace the older, more antiquated hitch units. These modern hitch units aide in reducing implement damage sometimes incurred during tillage of the soil and also assist, through automatic operation, in increasing the area of soil tilled during a unit of time. The principal areas of automation have been in the fields of draft control devices, including sensitivity adjustment features, and position control devices.

As a result of such automation, the number and complexity of component parts carried at the rear of the tractor have significantly multiplied. Consequently, the initial cost of manufacturing, shipping, and assemblying of the currently commercial automated tractor-implement hitch systems has risen at an alarming rate. Moreover, the conglomeration of components including draft sensing and depth control linkage, hydraulic units and lines, and the like, situated at the rear of the tractor has made the maintenance of the tractor and of the hitch components burdensome and the overall appearance unsightly.

The present invention is a simplified improvement over the above-mentioned tractor-implement hitch systems of the prior art. The instant invention uniquely accommodates both draft sensing and implement depth control through utilization of a single, power-actuated, transverse shaft at the back of the tractor which effectively eliminates the need for several previously necessary hitch components and streamlines the back of tractors for maintenance and appearance purposes.

In view of this foregoing it is a primary object of the present invention to provide an improved, simplified tractor-implement hitch system.

Another and no less important object of this invention is the provision of the tractor-implement hitch system, including a novel method and unique apparatus, capable of effectual utilization during both draft control and position control operations, the apparatus comprising a novel, power-rotated transverse shaft by which the position of the hitch draft arms and the depth of the implement are controlled and at which changes in draft are sensed.

These and other objects and features of the present invention will become more fully apparent from the following description and appended claims taken in conjunction with the accompanying drawings wherein:

FIGURE 1 is a fragmentary schematic perspective of an agriculture tractor utilizing the presently preferred novel hitch system of this invention;

FIGURE 2 is a cross-sectional view in elevation taken along line 2—2 of FIGURE 1;

Figure 3:
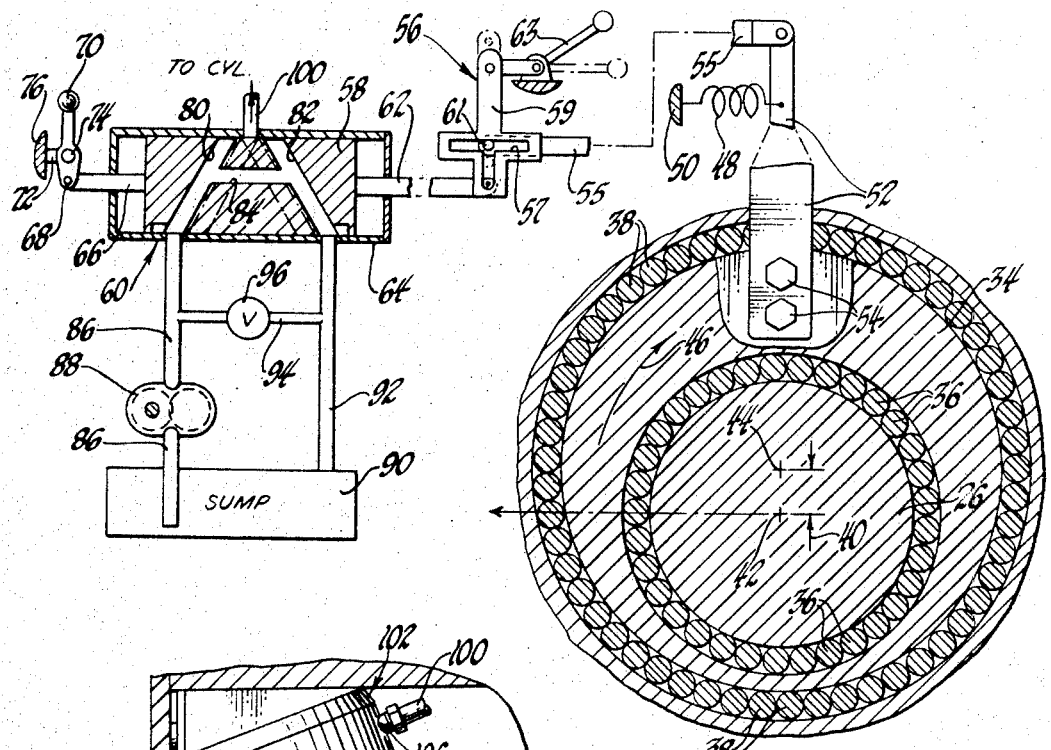
FIGURE 3 is a cross-sectional view taken along line 3—3 of FIGURE 2.

Reference is now made to the drawings wherein like numerals are used to designate corresponding parts throughout. FIGURE 1 depicts a tractor, generally designated 10, in fragmentary perspective, which tractor is of the agricultural type. Conventionally, the tractor 10 comprises, inter alia, a pair of wheels 12, only one of which is illustrated in FIGURE 1, an operator's seat 14 and a rear housing, generally designated 16. The rear housing 16 carries a pair of axle housings 18 through which an axle 20 concentrically passes in a conventional manner.

The rear tractor housing 16 rotatably carries an implement-tractor hitch mechanism, generally designated 22. In FIGURE 1, the hitch 22 is illustrated as comprising a pair of implement draft arms 24 which are non-rotatably secured to a transverse shaft 26, for example by spline connection. The shaft 26 is rotatably carried in the lower, rearward portion of the tractor housing 16.

The implement-tractor hitch 22 is illustrated in greater detail in FIGURE 2 to which reference is now made. Preliminarily, it is to be appreciated that the novel hitch 22 of the present invention substantially reduces the number of components requisite to proper and precise operation of the tractor-implement combination. The single transverse shaft 26 accommodates both the sensing of changes in draft to instigate correction of the soil-working depth of the implement during automatic draft control operation and also accommodates the raising and lowering of the implement through use of hydraulic power means, the operation of which is instigated either manually or in response to the mentioned sensed changes in draft.

As can be appreciated by inspection of FIGURE 2, the rear tractor housing 16, between each side 28 and the housing bottom 30, rotatably supports the combination sensing and elevating shaft 26 through an eccentric sensing device, generally identified as 32, one sensing device 32 being disposed at each end of the transverse shaft 26 immediately adjacent a draft arm 24.

It is to be appreciated that the draft sensing mechanism 32 as presented in this specification is only one type of sensing unit which may suitably be utilized in conjunction with the shaft 26 to sense changes in draft during automatic draft control operation. Other suitable sensing units could be used in preference to the sensing units 32, if desired.

Structurally, with reference to both FIGURES 2 and 3, the sensing unit 32, left and right hand sensing units being identical though opposite hand, comprises a rotatable intermediate eccentric shell 34 which is carried upon the transverse shaft 26 by a set of anti-friction needle bearings 36. The needle bearings 36 are enclosed on three sides by the somewhat U-shaped intermediate eccentric shell 34. The eccentric shell is appropriately provided with O-ring seals or the like. Furthermore, means, i.e., the snap ring 37, partially retain the shell 34, the needle bearings 36, and the shaft 26 in their related positions depicted in FIGURE 2.

The eccentric shell 34, along with the transverse shaft 26, is supported in the illustrated position in the tractor housing upon an additional set of anti-friction needle bearings 38.

The needle bearings 38 (as well as the eccentric shell 34 and the shaft 26) are retained in the position illustrated in the figures by an outer L-shaped casing 39 (which is bolted to the tractor housing) and by a snap ring 43. The outer casing 39 is appropriately provided with suitable O-ring seals or the like.

The two sets of bearings 36 and 38 surround respective surfaces of the eccentric shell 34 and accommodate a squeezing action upon both the right and left eccentric shells in response to changes in draft transmitted to the transverse shaft 26 through the draft arms 24, when such changes are positive in nature. This squeezing action induces clockwise rotation (as viewed in FIGURE 3) of the two eccentric shells 34 which shifts the shaft 26 vertically through a distance proportional to the positive change in draft, the transverse shaft being slightly rotated counterclockwise during this action to retain the draft arms momentarily in the same position, as will be explained in greater detail subsequently. The described lifting movement of the transverse shaft 26 reduces the vertical, eccentric distance, identified by arrows 40 in FIGURE 3, between the geometric center 42 of the shaft 26 and the geometric center 44 of the eccentric shell 34. This vertical shifting is merely incidental in the illustrated embodiment of the invention, since the present draft control relies on arcuate displacement of the shell 34.

Thus, rotation of the eccentric shell 34 in response to a positive change in draft is in the direction of arrow 46 and is counter to the tension force exerted by the tension spring 48 interposed between an integral connection with the tractor, schematically depicted as 50, and a sensing arm 52. The sensing arm 52 is bolted or otherwise suitably secured at 54 to the eccentric shell 34.

The operation of the sensing device 32 in response to a negative change in draft is substantially the same but the direction of rotation is counterclockwise, i.e., in the direction of the force exerted by the tension spring 48.

If greater detailed information is desired concerning the structure and operation of the sensing unit 32, which does not constitute part of the present invention, reference may be made to co-pending application for United States Letters Patent, Ser. No. 535,218, filed Mar. 17, 1966, and assigned to the assignee of the present invention, and wherein the eccentric sensing mechanism as such is claimed.

Such positive and negative changes in draft, as are above explained, correspondingly result in clockwise and counterclockwise movement, respectively, of a sensing arm 52 integral with the shell 34. Rotation of the arm 52 correspondingly displaces a link 55. The link 55 is joined by pin 61 to a draft and position control selector, generally designated 56, having a T-slot 57, as schematically depicted in FIGURE 3.

Briefly, when the hand lever 63 is positioned as depicted in solid lines in FIGURE 3, the pin 61 of the link 55 is disposed within the horizontally extending leg of the T-slot 57 of selector 56 (which pivotally depends from the left end of the hand level 63). Consequently, the hitch 22 is set for position (depth) control, since any changes in draft transmitted from the sensing units 32 through the sensing arm 52 and the link 55 will be dissipated as lost motion in the horizontal leg of the T-slot 57.

When the hand lever 63 is positioned as depicted in phantom lines in FIGURE 3, the pin 61 of the link 55 will be disposed within the vertical leg of the T-slot 57. Consequently, the hitch 22 is set for draft control and any displacement of link 55 in response to a change in draft as previously described will correspondingly displace the valve spool 58 of the control valve 60, through the spool extension rod 62. This displacement of the spool 58 is accommodated by a swinging action of the depending selector 56.

A suitable, commercially sold sensitivity adjustment unit may be interposed between the control valve and the sensing unit to selectively vary the response of the spool to any given magnitude of draft change. Restated, the primary function of a sensitivity adjustment unit is to transmit all or any selected proportion of the displacement of the arm 55 to the spool 58 of a control valve 60.

The control valve 60, schematically illustrated in FIGURE 3, comprises a valve housing 64. The rod 62 and another rod 66 each extend through the spool housing 64, and each such rod 62, 64 is integral with the spool 58. The rod 66 is pivotally connected by a pin at 68 to a hand lever 70. The hand lever 70 is supported by the tractor through an arm 72 at a pivot pin 74, arm 72 being integrally attached to the tractor, as schematically illustrated at 76.

Manipulation of the hand lever 70 shifts the spool 58 and thereby sets the depth at which the implement is to operate during position control operation, or the draft at which the implement is to operate during draft control operation.

As also schematically illustrated in FIGURE 3, the cylindrical spool 58 is provided with three hydraulic passages, 80, 82 and 84. Usually, a hydraulic line 86 continuously supplies hydraulic fluid under pressure from a pump 88 to the spool passage 80, the hydraulic fluid being supplied from and returned to a sump 90.

When the implement (not shown) is being pulled through the soil by the tractor 10 so as to exert a substantially constant draft upon the tractor, the spool 58 will remain in the "hold" position shown in FIGURE 3. In this hold position, the hydraulic fluid supplied to the line 86 flows sequentially through the valve passages 80, 84 and 82, and thereafter returns to the sump 90 through the return line 92.

Figure 4:
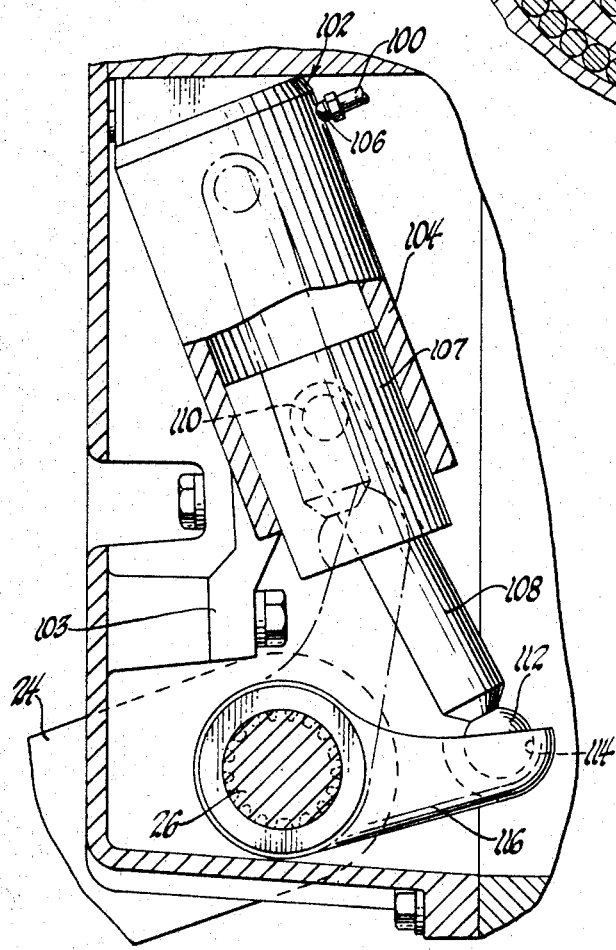
FIGURE 4 is a cross-sectional view taken along line 4—4 of FIGURE 2.

During soil tillage under draft control conditions, any increase in draft is sensed by the sensing units 32 and is transmitted through the sensing arm 52, the selector 56 and the rod 62 to displace the valve spool 58 a corresponding distance toward the right, as viewed in FIGURE 3. Thus, hydraulic fluid from the line 86 will pass through the passage 80 and through a hydraulic line 100 to the two hydraulic lift cylinders, generally designated 102 (FIGURE 4). The structure and operation of the lift cylinders 102 will be hereinafter briefly described.

As hydraulic fluid is delivered to the line 100, in the manner previously described, the spool 58, being displaced to the right, blocks the return line 92 so as to prevent return of hydraulic fluid to the sump.

Any decrease in draft which may occur during soil tillage is sensed by the sensing units 32 and will cause a counterclockwise rotation in the sensing arm 52 under the influence of the spring 48, as previously explained. Consequently, the valve spool 58 will be displaced toward the left, as viewed in FIGURE 3. Such displacement of the spool 68 closes the hydraulic line 86, forcing the hydraulic fluid delivered by the pump 88 to be circulated through the by-pass line 94, including the relief valve 96, and back to the sump 90 through the line 92. At the same time, the hydraulic line 100 and the return line 92 communicate through the valve passage 82. This accommodates exhaust of the hydraulic fluid from the rear of the two lift cylinders 102 at a pressure higher than the pump pressure, due to the weight of the implement imposed upon the cylinders 102. Exhausting of fluid from the cylinders 102 accommodates counterclockwise rotation of the transverse shaft 26, as viewed in FIGURE 4, which rotation lowers the implement.

Particular reference is now made to FIGURES 2 and 4 which schematically illustrate the pair of lift cylinders 102. The single-acting cylinders 102 are situated above the transverse shaft 26 and are attached to the tractor housing 16, in any suitable manner, such as by brackets 103 (FIGURE 4) which are bolt secured to the housing. Each lift cylinder, per se, is of conventional structure, having a cylinder housing 104 equipped at its upper, blind end with a hydraulic fitting 106 to accommodate hydraulic flow to and from the cylinder through the line 100. A piston 107 is carried within the casing 104 for reciprocal movement. A piston rod 108 is suitably attached to the piston 107 at 110 in FIGURE 4. The other end of the piston rod 108 comprises a ball 112 which fits within a socket 114 of an arm 116. The arm 116 is nonrotatably secured, by a spline connection or the like, to the transverse shaft 26.

Thus, when the control valve 60 is actuated in response to an increase in draft, hydraulic fluid under pressure is supplied through the line 100 into the cylinder housings 104. This displaces the pistons 106 downwardly which extends the piston rods 108. Extension of the piston rods 108, in turn, rotates the transverse shaft 26 clockwise, as viewed in FIGURE 4. This rotation lifts the draft arm 26 and the implement (not shown) to decrease the soil-working depth of the implement and thereby reduces the draft exerted by the implement upon the tractor.

When the control valve 60 is actuated in response to a decrease in draft or a negative change in draft sensed by the units 32, release of hydraulic fluid previously retained under pressure in the rear of the cylinder casings 104 will be accommodated by displacement of the spool 58. Thus, the hydraulic fluid will flow from the cylinders 102 through the line 100, the valve passage 82 and the return line 92, into the reservoir 90. As hydraulic fluid is exhausted from the cylinders 102, the piston rods 108 are retracted. The weight of the implement, which exerts a downward force upon the draft arms 24, simultaneously accommodates counterclockwise rotation of the shaft 26 through an angular distance corresponding to the extent of retraction of the piston rods 108 and adequate to increase the implement draft an amount sufficient to restore the desired draft. Once the implement is lowered and the draft is thereby increased, the increased draft will be sensed by the units 32 to again shift the spool 68 towards the right. This positions the spool in the position of FIGURE 3 and thus shuts off flow of hydraulic fluid to and from the lift cylinders 102, the hydraulic fluid under the influence of the pump 88 flowing from the sump 90 through the line 86, the pasages 80, 84 and 82 and then back to the sump 90 through the return line 92.

In view of the foregoing, it is to be appreciated that the present invention constitutes an improvement in tractor-to-implement hitch systems which utilize a single, power-actuated transverse shaft to novelly accommodate both draft sensing at the shaft and control rotation of the shaft to correspondingly vary the soil-working depth of the implement during automatic draft control operation. The novel hitch, identified generally by the numeral 22, also accommodates position or constant depth operation. This is accomplished by setting the selector 56 in the position shown in solid lines in FIGURE 3 such that any displacement of the link arm 55 in response to draft changes will be dissipated in the form of lost motion, with no displacement of the valve spool 58.

Thus, the control valve 60 is responsive to manual manipulation of the hand lever 70 which is utilized to set the depth at which the implement is to operate during position or constant depth control operation, and is also utilized during automatic draft control operation to initially lower the implement into the ground and to establish the predetermined magnitude of draft to be maintained during operation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In an automatic draft and position control system responsive to variations in a draft condition, a transverse sensing shaft selectively rotatably mounted for movement about a first and a second axis and carried by a tractor housing near the base thereof, draft arms interposed between the tractor and an implement, said draft arms being nonrotatably connected to the shaft at separate locations and together with said shaft responsive to variations in said draft during automatic draft control operations, said draft sensing shaft rotatably eccentrically mounted for movement about said first and said second axis in response to the changes in draft and generating a draft-correction signal proportional to each such change in draft, and power means responsive to each said signal such that said shaft accommodates appropriate rotation about said first and said second axis thereof to lift and lower the draft arms and the implement to restore the desired implement draft, said power means being subject to manual control to initially establish the desired magnitude of draft to be exerted by the implement upon the tractor during automatic draft control operation and to initially establish the soil depth at which the implement is to work during position control operation.

2. In an apparatus connecting an implement to a tractor for controlling soil-working operations, the combination comprising a sensing shaft rotatably disposed at the base of the tractor housing for rotation about a first and second axis in essentially transverse horizontal orientation and to which the implement is attached through draft arms to accommodate both (1) the sensing of changes in draft during draft control operation to instigate corrections in the soil-working depth of the implement and (2) the raising and lowering of the implement through power means, the operation of which is instigated in response to said sensed changes in draft as well as manually whereby the soil-working depth of the implement is controlled selectively during draft control operation and position control operation.

3. An apparatus as defined in claim 2, wherein said power means comprises two hydraulic cylinders, the extension and retraction of which respectively accommodates lifting and lowering of the implement.

4. In a method of controlling the magnitude of draft exerted upon a tractor by an earth working implement through draft arms nonrotatably carried by a transverse shaft rotatably mounted on said tractor for selective rotation about a first and second axis, the steps of transmitting to said shaft by said arms the actual draft force exerted by said implement, sensing any deviation of the actual draft forces so transmitted to the transverse shaft to effect rotation thereof about said first and second axis from a nominal pre-set draft force and generating a signal proportional to each such rotative deviation, and rotating the transverse shaft in response to each such signal to selectively raise and lower the draft arms and the implement.

5. In a method of controlling the soil-working depth of an implement drawn by a tractor through draft arms nonrotatably carried by a transverse shaft rotatable about a first and second axis, the steps of transmitting rotative forces representative of each change in draft through the draft arms to the transverse shaft, sensing each said rotative change in draft so transmitted and generating a signal representative of each rotative draft change sensed, dissipating each said signal, and manually manipulating power means to thereby appropriately rotate the transverse shaft to initially select and to subsequently alter the soil-working depth of said implement without regard to the magnitude of and variations in the draft exerted by the implement.

6. In a draft control system coupled with an implement connected to a tractor through draft arms with hydraulic motor means operable in response to changes in a condition to raise and lower the implement on the tractor and valve means for controlling the flow of fluid to and from said motor means, the combination comprising: a shaft mounted on said tractor movable in a first direction and a second direction relative to a second axis, said draft arms nonrotatably fixed to said shaft, said hydraulic motor means operably connected to said shaft for selective movement thereof relative to said tractor, bracket means on said tractor for mounting said shaft, said bracket means supporting said shaft for movement in said first and said second directions, sensing means responsive to movement of said shaft in said first and second directions for selectively actuating said control and in turn said hydraulic motor means to raise and lower said implement with respect to said tractor in response to said variations in a condition.

References Cited

UNITED STATES PATENTS 3,038,545   6/1962   Read _____ 172—439 X

FOREIGN PATENTS

| 519,394 | 3/1940 | Great Britain. |
| 68,841 | 2/1958 | France. |
| 1,036,015 | 4/1953 | France. |
| 458,143 | 11/1948 | Italy. |

ABRAHAM G. STONE, *Primary Examiner.*

JIMMIE R. OAKS, *Assistant Examiner.*